United States Patent
Miyahara

(10) Patent No.: US 9,104,157 B2
(45) Date of Patent: Aug. 11, 2015

(54) IMAGE FORMING APPARATUS FOR REDUCING DELAY WHICH OCCURS DUE TO TIMINGS OF RELEASE AND ALLOCATION OF A VIDEO BUFFER

(75) Inventor: Norifumi Miyahara, Osaka (JP)

(73) Assignee: Kyocera Document Solutions Inc (JP)

( * ) Notice: Subject to any disclaimer, the term of this patent is extended or adjusted under 35 U.S.C. 154(b) by 6 days.

(21) Appl. No.: 13/349,958

(22) Filed: Jan. 13, 2012

(65) Prior Publication Data

US 2012/0194869 A1    Aug. 2, 2012

(30) Foreign Application Priority Data

Jan. 27, 2011    (JP) ................. 2011-015674

(51) Int. Cl.
*G06K 15/00*    (2006.01)
*G03G 15/00*    (2006.01)
*G06K 15/02*    (2006.01)

(52) U.S. Cl.
CPC ............ *G03G 15/50* (2013.01); *G06K 15/1894* (2013.01)

(58) Field of Classification Search
CPC combination set(s) only.
See application file for complete search history.

(56) References Cited

U.S. PATENT DOCUMENTS

| 6,611,347 B1 * | 8/2003 | Okada et al. ............. 358/1.15 |
| 6,714,313 B1 * | 3/2004 | Sugaya ................. 358/1.15 |
| 2007/0097416 A1 * | 5/2007 | Higashimura et al. ....... 358/1.15 |
| 2008/0007754 A1 | 1/2008 | Torii |

FOREIGN PATENT DOCUMENTS

| JP | H05-345449 | 12/1993 |
| JP | H06-231036 | 8/1994 |
| JP | H09-219765 | 8/1997 |
| JP | 2002-019233 | 1/2002 |
| JP | 2003-032484 | 1/2003 |

* cited by examiner

*Primary Examiner* — Ashish K Thomas
*Assistant Examiner* — Idowu O Osifade

(57) ABSTRACT

This image forming apparatus includes: a development device configured to develop a toner image of a print image; an image carrier configured to transfer the toner image to a paper sheet; a print engine configured to control the development device and the image carrier; and a controller configured to control the print engine to perform printing. The print engine is further configured to provide a transfer-completion notice to the controller upon detecting completion of transferring the toner image from the image carrier to the paper sheet. The controller is further configured to store image data of the print image in a video buffer, read out the image data from the video buffer, provide control information based on the image data to the print engine, and release the video buffer upon receiving the transfer-completion notice.

6 Claims, 4 Drawing Sheets

IMAGE FORMING APPARATUS FOR REDUCING DELAY WHICH OCCURS DUE TO TIMINGS OF RELEASE AND ALLOCATION OF A VIDEO BUFFER

CROSS-REFERENCE TO RELATED APPLICATION

This application relates to and claims priority rights from a Japanese Patent Application: No. 2011-015674, filed on Jan. 27, 2011, the entire disclosures of which are hereby incorporated by reference herein.

BACKGROUND

1. Field

The present invention relates to image forming apparatuses for reducing delay which occurs due to timings of release and allocation of a video buffer.

2. Description of the Related Art

When an image forming apparatus such as printer or multi function peripheral performs a printing process, a video buffer is allocated in a RAM (Random Access Memory), and image data of one page is temporarily stored in the video buffer. The image data is read out from the video buffer and image processing of the image data is performed to generate control information used to control a printing mechanism in the apparatus. According to the control information, an electrostatic latent image is formed on a photoconductor drum, and toner development of the electrostatic latent image is performed. A toner image generated in the toner development is transferred onto a printing paper sheet, and fixed on the paper sheet, and then the paper sheet is outputted. After printing of one page is finished and the paper sheet is outputted, the video buffer of the page is released.

SUMMARY

In case that printing processes of plural pages are sequentially performed, a video buffer of a page is released after finishing output of a paper sheet of the page; and after releasing the video buffer, a printing process of a next page is started, and image data is stored into a video buffer of the next page. Therefore, delay occurs when the printing process of the next page is started.

This invention has been made in view of the aforementioned circumstances. It is an object to the present invention to provide image forming apparatuses capable of reducing delay which occurs due to timings of release and allocation of a video buffer.

The present invention solves this subject as follows.

An image forming apparatus according to an aspect of this disclose includes: a development device configured to develop a toner image of a print image; an image carrier configured to transfer the toner image to a paper sheet; a print engine configured to control the development device and the image carrier; and a controller configured to control the print engine to perform printing. The print engine is further configured to provide a transfer-completion notice to the controller upon detecting completion of transferring the toner image from the image carrier to the paper sheet. The controller is further configured to store image data of the print image in a video buffer, read out the image data from the video buffer, provide control information based on the image data to the print engine, and release the video buffer upon receiving the transfer-completion notice.

Therefore, since a printing process of a next page is started without waiting for output of a paper sheet of a current page, delay which occurs due to timings of release and allocation of a video buffer is reduced.

An image forming apparatus according to another aspect of this disclose includes: a photoconductor; a development device configured to form an electrostatic latent image of a print image on the photoconductor and form a toner image of the electrostatic latent image by toner development; a print engine configured to control the development device; and a controller configured to control the print engine to perform printing. The print engine is further configured to provide an image-forming-completion notice to the controller upon detecting completion of forming either the electrostatic latent image or the toner image. The controller is further configured to store image data of the print image in a video buffer, read out the image data from the video buffer, provide control information based on the image data to the print engine, and release the video buffer upon receiving the image-forming-completion notice.

Therefore, since a printing process of a next page is started without waiting for output of a paper sheet of a current page in case that a video buffer for one page is allocated in the video buffer page by page, delay which occurs due to timings of release and allocation of a video buffer is reduced.

These and other objects, features and advantages of the present invention will become more apparent upon reading of the following detailed description along with the accompanied drawings.

DETAILED DESCRIPTION OF THE PREFERRED EMBODIMENT

Hereinafter, embodiments according to aspects of the present invention will be explained with reference to drawings.

Embodiment 1

Figure 1:
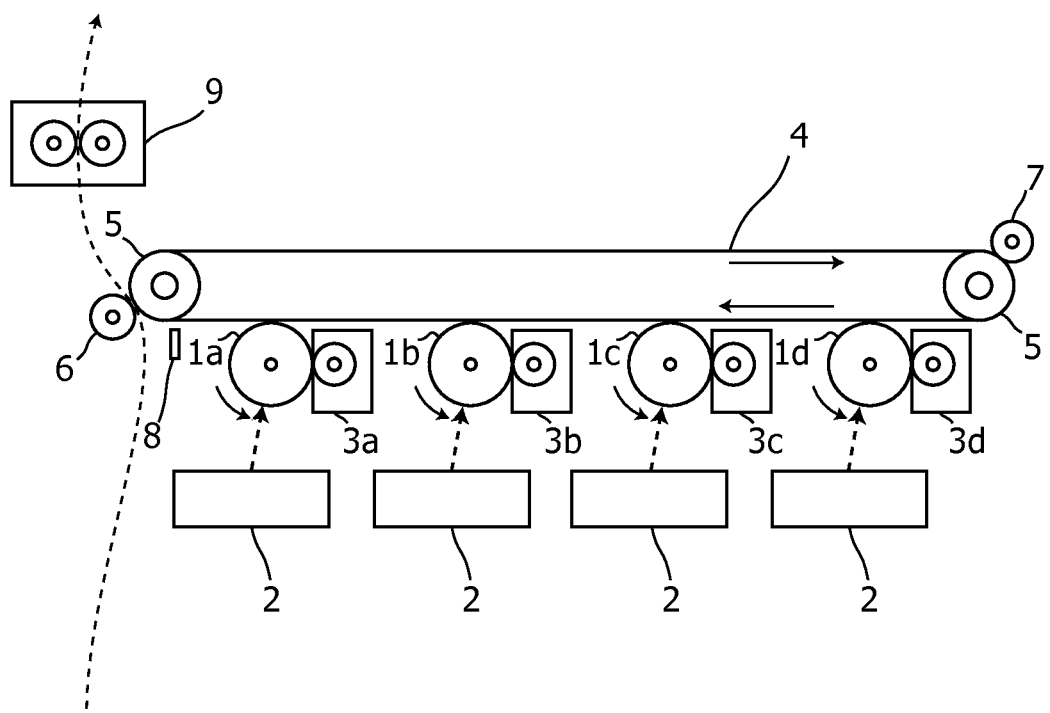
FIG. 1 is a side view that partially shows a mechanical internal configuration of an image forming apparatus in these embodiments.

FIG. 1 is a side view that partially shows a mechanical internal configuration of an image forming apparatus in an embodiment according to this invention. This image forming apparatus is an apparatus having a printing function such as printer, facsimile apparatus, copier, or multi function peripheral.

The image forming apparatus in this embodiment has a tandem-type color development device. This color development device includes photoconductor drums $1a$ to $1d$, an exposure device 2, and development devices $3a$ to $3d$. The photoconductor drums $1a$ to $1d$ are four color photoconductors of Cyan, Magenta, Yellow and Black.

The exposure device 2 is a device that forms an electrostatic latent image by irradiating laser light to each of the photoconductor drums $1a$ to $1d$. The laser light is scanned in the direction (primary scanning direction) perpendicular to the rotation direction (secondary scanning direction) of the photoconductor drum 1a, 1b, 1c or 1d. The exposure device 2 includes a laser diode as a light source of the laser light, optical elements (such as lens, mirror and polygon mirror) that guide the laser light to each of the photoconductor drums 1a to 1d.

Further, in the periphery of each of the photoconductor drums 1a to 1d, a charging unit such as scorotron, a cleaning device, a static electricity eliminator and so on are disposed. The cleaning device removes residual toner on the photoconductor drum 1a, 1b, 1c, or 1d after primary transfer. The static electricity eliminator eliminates static electricity of the photoconductor drum 1a, 1b, 1c, or 1d after primary transfer.

The development device 3a, 3b, 3c, or 3d includes a toner cartridge and a development unit. The toner cartridge contains toner of one of four colors: Cyan, Magenta, Yellow, and Black. The toner is supplied from a toner hopper in the toner cartridge to the development unit. The development unit adheres the toner on the photoconductor drum 1a, 1b, 1c, or 1d. The development device 3a, 3b, 3c, or 3d forms a toner image by adhering the toner to an electrostatic latent image on the photoconductor drum 1a, 1b, 1c, or 1d.

The photoconductor drum 1a and the development device 3a perform development of Magenta. The photoconductor drum 1b and the development device 3b perform development of Cyan. The photoconductor drum 1c and the development device 3c perform development of Yellow. The photoconductor drum 1d and the development device 3d perform development of Black.

The intermediate transfer belt 4 is a loop-shaped image carrier and intermediate transfer member, and contacts the photoconductor drums 1a to 1d. Toner images on the photoconductor drums 1a to 1d are primarily transferred onto the intermediate transfer belt 4. The intermediate transfer belt 4 is hitched round driving rollers 5, and rotates by driving force of the driving rollers 5 towards the direction from the contact position with the photoconductor drum 1d to the contact position with the photoconductor drum 1a.

A transfer roller 6 makes a conveyed paper sheet contact the transfer belt 4, and secondarily transfers the toner image on the transfer belt 4 to the paper sheet. The paper sheet on which the toner image has been transferred is conveyed to a fuser 9, and consequently, the toner image is fixed on the paper sheet.

A roller 7 has a cleaning brush, and removes residual toner on the intermediate transfer belt 4 by contacting the cleaning brush to the intermediate transfer belt 4 after transferring the toner image to the paper sheet.

A sensor 8 irradiates light to the intermediate transfer belt 4, and detects its reflection light from a surface of the intermediate transfer belt 4 or a toner pattern on the intermediate transfer belt 4. For example, in density adjustment, the sensor 8 irradiates light to a predetermined area on the intermediate transfer belt 4, detects its reflection light, and outputs an electrical signal corresponding to the detected intensity of the reflection light.

Figure 2:
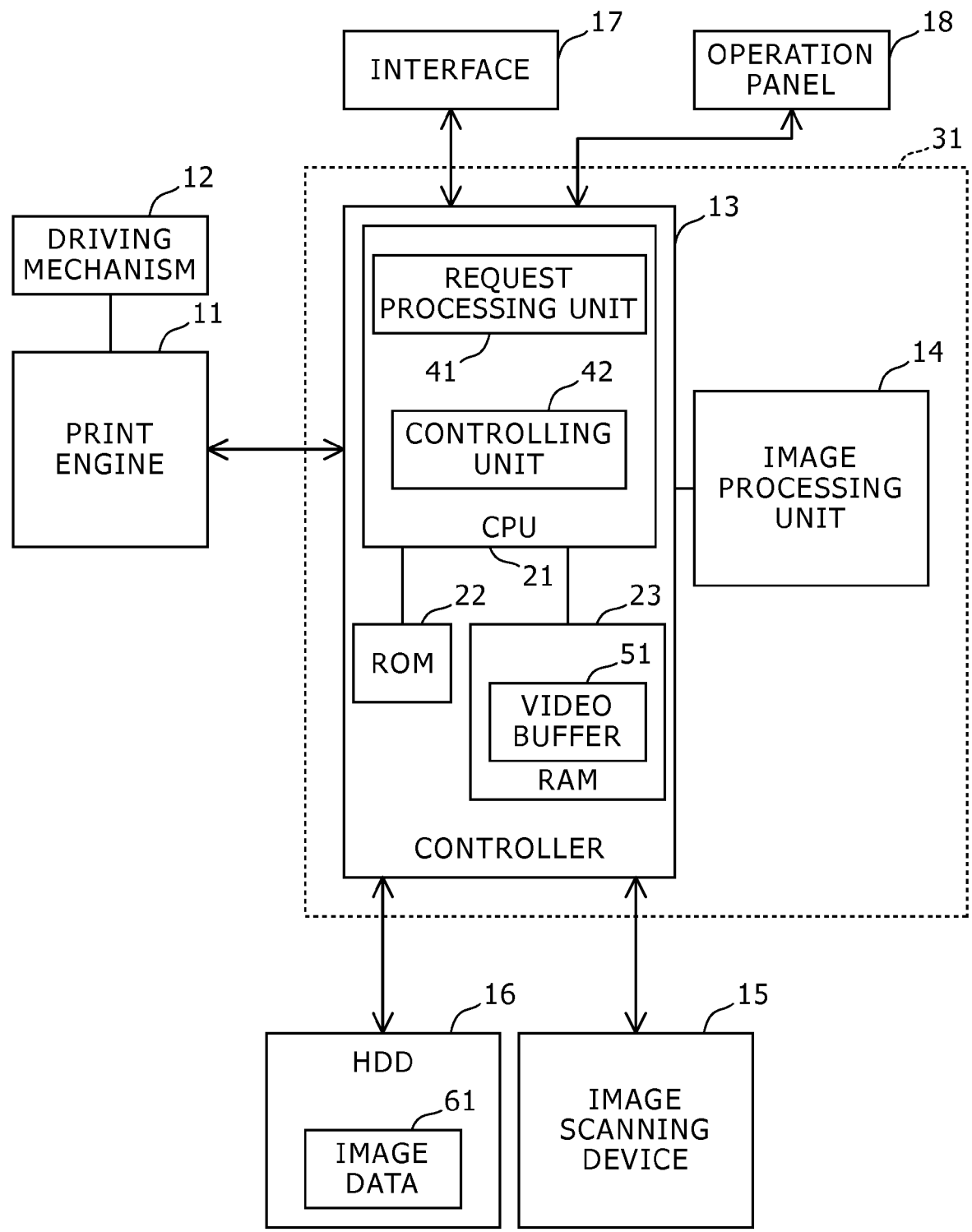
FIG. 2 is a block diagram that shows an electronic configuration of the image forming apparatus in the embodiments.

FIG. 2 is a block diagram that shows an electronic configuration of the image forming apparatus in this embodiment according to this invention. This image forming apparatus includes a print engine 11, a driving mechanism 12, a controller 13, an image processing unit 14, an image scanning device 15, a hard disk drive (HDD) 16, an interface 17, and an operation panel 18.

In FIG. 2, the print engine 11 is an electronic circuit which controls the driving mechanism 12 for electro-photography process and paper sheet conveyance, and for example, consists of one circuit board. The print engine 11 performs printing according to control information received from the controller 13. The driving mechanism 12 is a driving mechanism which drives components in the mechanical configuration shown in FIG. 1 for electro-photography process and paper sheet conveyance. For instance, the driving mechanism of paper sheet conveyance includes motors which drive rollers for (a) paper sheet input, (b) paper sheet conveyance to the aforementioned development device and the fuser 9, (c) paper sheet output after completion of printing, and so on. For instance, the driving mechanism of electro-photography process includes motors which drive the photoconductor drums 1a to 1d, the intermediate transfer belt 4, etc., and motors for laser scanning of the exposure device 2.

In Embodiment 1, the print engine 11 provides a transfer-completion notice to the controller 13 upon detecting completion of transferring the toner image from the intermediate transfer belt 4 to a print paper sheet. The transfer-completion notice indicates that the completion of transferring the toner image. Further, the print engine 11 provides a sheet-output-completion notice to the controller 13 upon detecting completion of outputting the paper sheet. The sheet-output-completion notice indicates that the completion of outputting the paper sheet.

The controller 13 is a processor which manages jobs and controls internal devices (the print engine 11, the image scanning device 15, the interface 17, the operation panel 18, etc.) in this image forming apparatus. For example, the controller 13 is composed of another circuit board than that of the print engine 11. The image processing unit 14 is an electronic circuit which performs image processing (image rotation, image enlargement/reduction, halftoning, etc.) of image data. In this embodiment, the controller 13 and the image processing unit 14 are composed of one or more ASICs (Application Specific Integrated Circuits).

The controller 13 is a computer which includes a CPU (Central Processing Unit) 21, a ROM (Read Only Memory) 22, and a RAM (Random Access Memory) 23, and loads programs into the RAM 22 from the ROM 23 or an unshown non-volatile memory device and executes the programs by the CPU 21 to form some processing units. In this embodiment, a request processing unit 41 and a controlling unit 42 are formed in the controller 13.

The request processing unit 41 receives a job request which corresponds to a user operation to the operation panel and a job request from a host device, and causes the controlling unit 42 to perform the requested job. The request processing unit 41 receives print data from the host device using the interface 17, and generates image data of a print image based on the received print data. For instance, the print data is described in PDL (Page Description Language).

If a request of a print job (as the print data) is received or a request of a copy job is received in accordance with a user operation to the operation panel 18, then the controlling unit 42 controls the internal devices for the job and provides control information based on the image data of the print image to the print engine 11 in order to perform printing.

The controlling unit 42 in the controller 13 stores the image data of the print image in a video buffer 51, reads out the image data from the video buffer 51, and provides control information based on the image data to the print engine 11. Further, the controlling unit 42 releases the video buffer 51 immediately upon receiving the transfer-completion notice from the print engine 11.

Furthermore, the controlling unit 42 of the controller 13 reads out image data 61 of a print image from the hard disk drive 16, and stores the image data in the video buffer 51. Upon receiving the sheet-output-completion notice from the print engine 11, the controlling unit 42 deletes the image data 61 in the hard disk drive 16. Specifically, at the timing when printing of one page is completed, image data of the page in the image data 61 is deleted.

For printing of each page, a video buffer 51 is allocated in the RAM 23 so that image data of one page can be stored in the video buffer 51.

The image scanning device 15 is an internal device which optically scans a document image from a document, and generates image data of the document image.

The hard disk drive 16 is a storage device in which image data 61 of one or more pages in a document (i.e. in a job) can be stored. Image data generated from the received print data, image data generated by the image scanning device 15, image data generated from a facsimile signal by an unshown facsimile apparatus, etc. are temporarily stored as the image data 61 in the hard disk drive 16.

The interface 17 is an electronic circuit capable of connecting the host device such as personal computer or a portable memory medium such as USB (Universal Serial Bus) memory or memory card. For instance, a network interface, a USB interface, a memory card interface etc. are used as the interface 17.

The operation panel 18 is disposed on a surface of a housing of this image forming apparatus, and includes an input device such as button switch and a display device such as liquid crystal display and indicator. The operation panel 18 displays information to a user or a service person using the display device, and detects operation of the user or the service person using the input device.

In the following part, an operation of the aforementioned image forming apparatus is explained.

Figure 3:
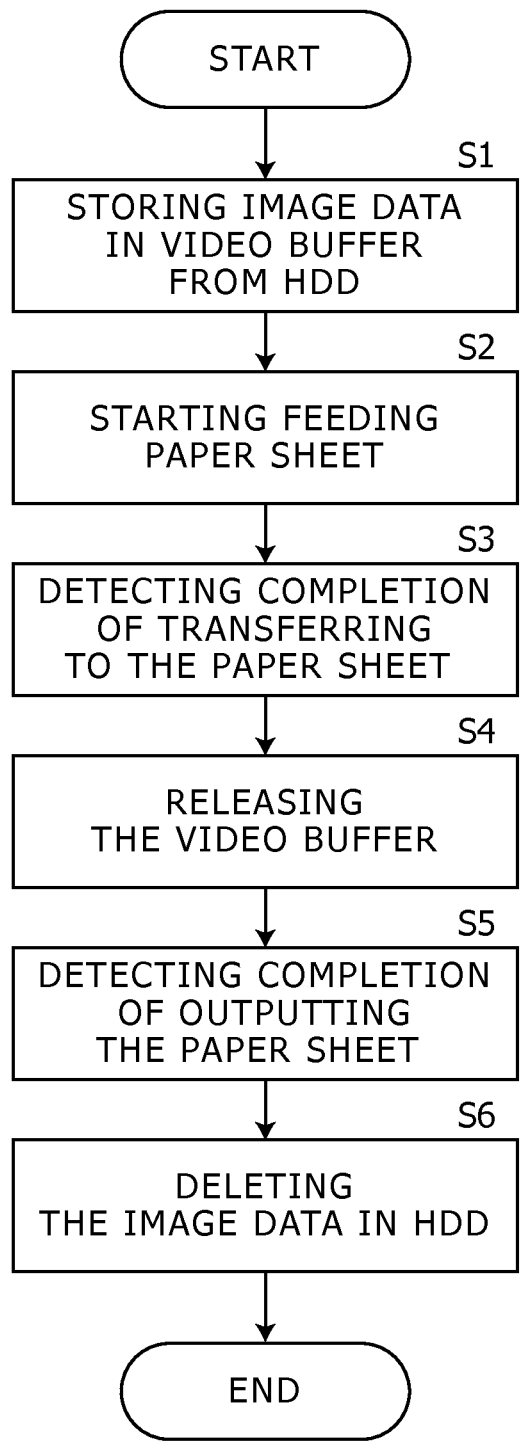
FIG. 3 is a flowchart that shows an operation of the image forming apparatus in Embodiment 1.

FIG. 3 is a flowchart that shows an operation of the image forming apparatus in Embodiment 1.

Image data generated from print data or image data generated by the image scanning device 15 is compressed, for example, band by band, and the compressed image data is stored in the hard disk drive 16 page by page.

Control information (e.g. information on selection of paper feed tray) of a job based on the image data may be stored with the image data in the hard disk drive 16.

Thereafter, the controlling unit 42 of the controller 13 reads out the compressed image data of a page to be printed from the hard disk drive 16, and stores it in the video buffer 51 (Step S1). The controlling unit 42 may convert a data format of the image data read out from the hard disk drive 16, and may store the image data in the converted data format into the video buffer 51.

The controller 13 provides control information to the print engine 11 in order to start a printing process of a page, and reads out the image data from the video buffer 51, for example, band by band, and generates control information from the image data through image processing by the image processing unit 14 after decompression, and provides the generated control information to the print engine 11. It should be noted that the image data may be decompressed before storing it in the video buffer 51.

The print engine 11 starts feeding a paper sheet upon receiving the control information on starting the printing process (Step S2), and controls the driving mechanism 12 according to the following control information in order to perform printing of the page.

The exposure device 2 forms electrostatic latent images of the page on the photoconductor drums 1a to 1d, and the development devices 3a to 3d forms toner images of the electrostatic latent images by toner development, and the intermediate transfer belt 4 transfers the toner images (i.e. a multi-color toner image) from the photoconductor drums 1a to 1d onto the fed paper sheet.

The print engine 11 detects completion of transferring the toner images to the paper sheet. Upon detecting the completion, the print engine 11 transmits a transfer-completion notice to the controller 13 (Step S3). For example, the print engine 11 detects the completion on the basis of the number of rotations or a rotation angle of the driving rollers 5, a rotation position of the intermediate transfer belt 4, and so on.

The controlling unit 42 of the controller 13 receives the transfer-completion notice. Upon receiving the transfer-completion notice, the controlling unit 42 releases the video buffer 51 for the image data of the page (Step S4).

After transferring the toner images onto the paper sheet, the paper sheet is conveyed to the fuser 9, and the fuser 9 fixes the toner images on the paper sheet. Thereafter, the paper sheet is outputted and the printing of the page is finished.

The print engine 11 detects completion of outputting the paper sheet. Upon detecting the completion, the print engine 11 transmits a sheet-output-completion notice to the controller 13 (Step S5). For example, the print engine 11 detects the completion by an unshown optical sensor.

The controlling unit 42 of the controller 13 receives the sheet-output-completion notice. Upon receiving the sheet-output-completion notice, the controlling unit 42 deletes the image data of the page in the hard disk drive 16 (Step S6). The controlling unit 42 may delete the control information (e.g. information on selection of paper feed tray) of the job based on the image data together with the image data.

The video buffer 51 of the current page is released in Step S4, so that a vacant area increases in the RAM 23, and consequently, the controlling unit 42 of the controller 13 immediately allocates a video buffer 51 for the next page, and reads out the image data of the next page from the hard disk drive 16, and stores it in the video buffer 51, and causes the print engine 11 to start a printing process of the next page. The printing process of the next page is performed in the same manner.

In Embodiment 1, the print engine 11 provides a transfer-completion notice to the controller 13 upon detecting completion of transferring the toner image from the intermediate transfer belt 4 to a print paper sheet. The controller 13 stores the image data of the print image in a video buffer 51, reads out the image data from the video buffer 51, and provides control information based on the image data to the print engine 11. Further, the controller 13 releases the video buffer 51 upon receiving the transfer-completion notice from the print engine 11.

Therefore, since a printing process of the next page is started without waiting for output of a paper sheet of the current page, delay which occurs due to timings of release and allocation of the video buffer 51 is reduced.

Further, in Embodiment 1, since the video buffer 51 is released after completion of transferring the toner images onto the paper sheet, even if an error (e.g. conveyance delay of the paper sheet to a transferring position of the intermediate transfer belt 4) occurs before the completion of transferring, it is possible to perform printing again using the image data in the video buffer 51, without transferring the image data again from the hard disk drive 16 to the video buffer 51.

Embodiment 2

Although the image forming apparatus in Embodiment 1 releases the video buffer 51 upon completion of transferring the toner images onto the paper sheet, the image forming apparatus in Embodiment 2 releases the video buffer 51 upon completion of forming either electrostatic latent images on the photoconductor drums 1a to 1d or forming toner images of the electrostatic latent images by toner development.

Basic configuration and operation of the image forming apparatus in Embodiment 2 are identical to those in Embodiment 1, and therefore, they are not explained here. However, the print engine 11 and the controller 13 in Embodiment 2 operate in the following manner.

In Embodiment 2, the print engine 11 provides an image-forming-completion notice to the controller 13 upon detecting completion of forming either the electrostatic latent images or the toner images. The controlling unit 42 of the controller 13 receives the image-forming-completion notice. Upon receiving the image-forming-completion notice, the controlling unit 42 releases the video buffer 51.

In the following part, an operation of the aforementioned image forming apparatus is explained.

Figure 4:
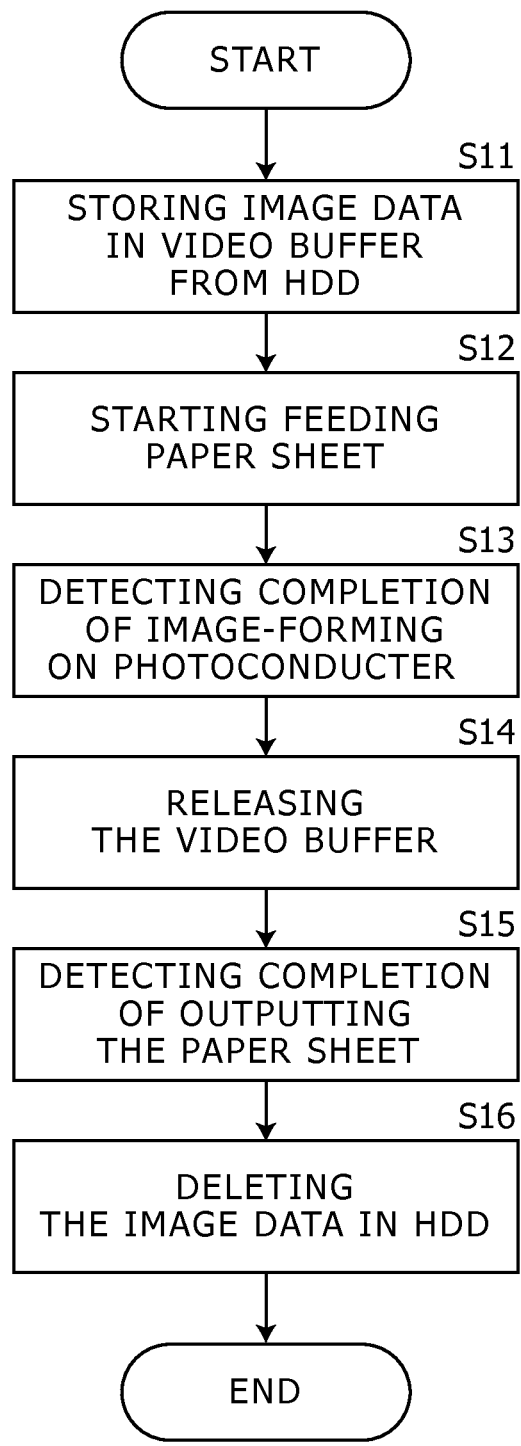
FIG. 4 is a flowchart that shows an operation of the image forming apparatus in Embodiment 2.

FIG. 4 is a flowchart that shows an operation of the image forming apparatus in Embodiment 2. Here is explained the case that an image-forming-completion notice is provided to the controller 13 due to completion of forming electrostatic latent images.

Image data generated from print data or image data generated by the image scanning device 15 is compressed, for example, band by band, and the compressed image data is stored in the hard disk drive 16 page by page. Control information (e.g. information on selection of paper feed tray) of a job based on the image data may be stored with the image data in the hard disk drive 16.

Thereafter, the controlling unit 42 of the controller 13 reads out the compressed image data of a page to be printed from the hard disk drive 16, and stores it in the video buffer 51 (Step S11). The controlling unit 42 may convert a data format of the image data read from the hard disk drive 16, and may store the image data in the converted data format in the video buffer 51.

The controller 13 provides control information to the print engine 11 in order to start a printing process of a page, and reads out the image data from the video buffer 51, for example, band by band, and generates control information from the image data through image processing by the image processing unit 14 after decompression, and provides the generated control information to the print engine 11. It should be noted that the image data may be decompressed before storing it in the video buffer 51.

The print engine 11 starts feeding a paper sheet upon receiving the control information on starting the printing process (Step S12), and controls the driving mechanism 12 according to the following control information in order to perform printing of the page.

The exposure device 2 forms electrostatic latent images of the page on the photoconductor drums 1a to 1d, and the development devices 3a to 3d forms toner images of the electrostatic latent images by toner development, and the intermediate transfer belt 4 transfers the toner images (i.e. a multi-color toner image) from the photoconductor drums 1a to 1d onto the fed paper sheet.

The print engine 11 detects completion of forming electrostatic latent images on the photoconductor drums 1a to 1d. Upon detecting the completion, the print engine 11 transmits an image-forming-completion notice to the controller 13 (Step S13).

The controlling unit 42 of the controller 13 receives the image-forming-completion notice. Upon receiving the image-forming-completion notice, the controlling unit 42 releases the video buffer 51 for the image data of the page (Step S14).

After transferring the toner images onto the paper sheet, the paper sheet is conveyed to the fuser 9, and the fuser 9 fixes the toner images on the paper sheet. Thereafter, the paper sheet is outputted and the printing of the page is finished.

The print engine 11 detects completion of outputting the paper sheet. Upon detecting the completion, the print engine 11 transmits a sheet-output-completion notice to the controller 13 (Step S15).

The controlling unit 42 of the controller 13 receives the sheet-output-completion notice. Upon receiving the sheet-output-completion notice, the controlling unit 42 deletes the image data of the page in the hard disk drive 16 (Step S16). The controlling unit 42 may delete the control information (e.g. information on selection of paper feed tray) of the job based on the image data together with the image data.

The video buffer 51 of the current page is released in Step S14, so that a vacant area increases in the RAM 23, and consequently, the controlling unit 42 of the controller 13 immediately allocates a video buffer 51 for the next page, and reads out the image data of the next page from the hard disk drive 16, and stores it in the video buffer 51, and causes the print engine 11 to start a printing process of the next page. The printing process of the next page is performed in the same manner.

In Embodiment 2, the print engine 11 provides an image-forming-completion notice to the controller 13 upon detecting completion of forming either the electrostatic latent images or the toner images. The controller 13 stores image data of the print image in a video buffer 51, reads out the image data from the video buffer 51, and provides control information based on the image data to the print engine 11. Further, the controller 13 releases the video buffer 51 upon receiving the image-forming-completion notice.

Therefore, since a printing process of the next page is started without waiting for output of a paper sheet of the current page, delay which occurs due to timings of release and allocation of the video buffer 51 is reduced.

The description of the present invention has been presented for purposes of illustration and description, and is not intended to be exhaustive or limited to the invention in the form disclosed. Many modifications and variations will be apparent to those of ordinary skill in the art.

For example, in any of the aforementioned embodiments, upon receiving the sheet-output-completion notice, the controller 13 determines whether the video buffer 51 has been released successfully in Step S4 or Step S14, and tries to release the video buffer 51 again if the video buffer 51 has not been released successfully. Therefore, it prevents a vacant area in the RAM 23 from decreasing due to a release failure of the video buffer 51.

Further, in any of the aforementioned embodiments, in case of multiple-copy print, until printing of each page in the last copy is completed, image data of the page is maintained in the hard disk drive 16, and the image data of the page in the hard disk drive 16 is repeatedly used for each copy.

Furthermore, the video buffer 51 in Embodiment 2 has a size capable of storing image data of one page. Alternatively, the video buffer 51 may have a size of image data of one band, and upon detecting completion of forming electrostatic latent images of one band, the print engine 11 may transmit an image-forming-completion notice to the controller 13, and the controller 13 may release the video buffer 51 for the band, and allocate a video buffer 51 for the next band, and cause to perform image processing and latent image forming of the next band.

Furthermore, although this invention is applied to a color image forming apparatus in the aforementioned embodiments, this invention may be applied to a monochrome image forming apparatus.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
   a photoconductor;
   a development device configured to form an electrostatic latent image of a print image on the photoconductor and form a toner image of the electrostatic latent image by toner development;
   a print engine configured to control the development device; and
   a controller configured to control the print engine to perform printing;
   wherein the print engine is further configured to provide an image-forming-completion notice to the controller upon detecting completion of forming either the electrostatic latent image or the toner image; and
   the controller is further configured to store image data of the print image in a video buffer, said video buffer having a size to hold the image data of one band; wherein said image data being generated based on the print data received about the print image representing one page of the image to be printed and being used to directly control said print engine in printing the page of the image, and release the video buffer before the completion of the printing process upon detecting completion of forming either the electrostatic latent image or the toner image, wherein the formation of the electrostatic latent image and the toner image occurs before the transfer of the toner image to the paper; and said controller stores and releases the image data in the video buffer band by band.

2. The image forming apparatus according to claim 1, further comprising:
   a storage device in which the image data of the print image is stored;
   wherein the print engine is further configured to provide a sheet-output-completion notice to the controller upon detecting completion of outputting the paper sheet; and
   the controller is further configured to read out the image data from the storage device, store the image data in the video buffer, and delete the image data in the storage device upon receiving the sheet-output-completion notice.

3. The image forming apparatus according to claim 2, wherein:
   upon receiving the sheet-output-completion notice, the controller is further configured to determine whether the video buffer has been released successfully, and try to release the video buffer again if the video buffer has not been released successfully.

4. The image forming apparatus according to claim 2, wherein:
   the controller is further configured to control the print engine according to the control information to perform printing, and delete the image data and the control information in the storage device upon receiving the sheet-output-completion notice.

5. The image forming apparatus according to claim 2, wherein:
   the controller is further configured to convert a data format of the image data after reading out the image data from the storage device, and store the image data in the converted data format into the video buffer.

6. The image forming apparatus according to claim 2, wherein:
   in case of multiple-copy print, the controller is further configured to delete the image data in the storage device upon receiving the sheet-output-completion notice of the last copy.

* * * * *